(12) United States Patent
Freitag et al.

(10) Patent No.: US 6,932,440 B1
(45) Date of Patent: Aug. 23, 2005

(54) AUTOMOTIVE BRAKING METHOD AND DEVICES FOR CARRYING OUT SAID METHOD

(75) Inventors: Rainer Freitag, Owen (DE); Wilfried Huber, Ostelsheim (DE); Armin Mueller, Rahden (DE); Harry Troester, Tamm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/129,142

(22) PCT Filed: Nov. 2, 2000

(86) PCT No.: PCT/EP00/10796

§ 371 (c)(1),
(2), (4) Date: Sep. 18, 2002

(87) PCT Pub. No.: WO01/32487

PCT Pub. Date: May 10, 2001

(30) Foreign Application Priority Data

Nov. 3, 1999 (DE) .............................. 199 52 781

(51) Int. Cl.⁷ ............................................. B60T 8/88
(52) U.S. Cl. .................... 303/122.09; 303/122; 303/3; 303/20
(58) Field of Search .................... 303/122, 122.03, 303/122.04, 122.05, 122.06, 122.09–122.15, 303/3, 20; 192/220, 215, 220.1

(56) References Cited

U.S. PATENT DOCUMENTS

| 4,039,061 | A | * | 8/1977 | Pruvot et al. ............... 192/220 |
| 4,501,170 | A | * | 2/1985 | Muller et al. ................. 477/94 |
| 4,591,016 | A | * | 5/1986 | Matthews ....................... 303/3 |
| 5,577,580 | A | * | 11/1996 | Polzin et al. ............... 192/220 |
| 5,775,784 | A | * | 7/1998 | Koga et al. ..................... 303/3 |
| 6,249,736 | B1 | * | 6/2001 | Schmidt et al. ........ 303/122.05 |
| 6,283,239 | B1 | * | 9/2001 | Tsukamoto et al. ........ 180/65.2 |

FOREIGN PATENT DOCUMENTS

| DE | 4330391 | 5/1996 |
| DE | 4329918 | 11/1996 |
| DE | 19735015 | 11/1996 |
| EP | 0466036 | 1/1992 |
| EP | 0924128 | 6/1999 |
| GB | 2195963 | 4/1988 |

\* cited by examiner

*Primary Examiner*—Thomas Williams
(74) *Attorney, Agent, or Firm*—Crowell & Moring LLP

(57) ABSTRACT

A method and apparatus for braking a vehicle having a vehicle brake system with a brake control device, and an engine whose torque is transmitted via a transmission to driven wheels. When there is a malfunction of the braking system and a demand for a braking operation, the transmission ratio is increased by a transmission control unit, which activates the transmission, to produce increased braking torque at the driven wheels.

16 Claims, 2 Drawing Sheets

AUTOMOTIVE BRAKING METHOD AND DEVICES FOR CARRYING OUT SAID METHOD

This application claims the priority of German patent document 199 52 781.4, filed 3 Nov. 1999 (PCT International Application No. PCT/EP00/10796, filed 2 Nov. 2000) the disclosure of which is expressly incorporated by reference herein.

The invention relates to a method and apparatus for braking a vehicle, including an electrically activatable brake control device.

Modern vehicle brake systems can be activated electrically to trigger the braking operation. For example, a known electrohydraulic brake system comprises a pressure-generating unit (e.g., motor/pump unit), an accumulator and electrically activatable valve units for actuating front and rear wheel brake devices. In addition, electromechanical vehicle brake systems are known, which manage without hydraulic fluid (so-called "dry brake system").

German patent document DE 197 35 015 A1 discloses that a number of "x-by-wire systems" are connected to one another and, if one of the x-by-wire systems fails, the x-by-wire systems that are still operational put the vehicle into a safe condition.

Furthermore, British patent document GB 2 195 963 discloses an additional braking unit, which is provided in the drive train. If the service brake system fails, the driver can actuate the additional braking unit manually in order to reduce the speed of the vehicle.

In order to bring the vehicle to a halt at the legally prescribed minimum deceleration in an emergency in the event of a malfunction in the vehicle brake system (if the hydraulic pressure-generating unit, sensors, valves or other hydraulic components fail, for example), a fall-back level is required to allow the wheel brake devices to be connected directly hydraulically to a dual-circuit brake master cylinder (known per se) at the wheels on the front axle, for example, thus allowing brake pressure to be generated in the wheel brake devices by means of the hydraulic connection. A braking distance within the bounds of the legal requirements is thereby made possible.

One object of the invention to provide an improved method and apparatus for braking a vehicle of the type described above.

Another object of the invention is to reduce the necessary braking distance in a simple manner, especially in an emergency in the event of a malfunction in the vehicle brake system.

These and other objects and advantages are achieved by the method and apparatus according to the invention, which provides additional braking of the driven axle essentially without a large number of additional components. For this purpose, a transmission control unit causes an automatic change in the transmission ratio, increasing the overrun torque acting at the driven wheels. Considerable shortening of braking operations is thereby achieved in emergency situations in the event of a braking operation with a reduced braking effect by the vehicle brake system; e.g., if the pressure-generating unit for the hydraulic brake pressure fails or a brake circuit fails.

The increase in the braking torque at the driven wheels by improved utilization of the existing engine overrun torque can be achieved in many different ways and with many different types of transmission.

In an advantageous embodiment for a vehicle with an automatic power-shift transmission, the transmission ratio of the automatic power-shift transmission is increased by shifting down to a lower drive step.

In another embodiment for a vehicle fitted with a manual transmission, the transmission ratio is advantageously increased by shifting down to a lower gear by means of actuators. This embodiment is suitable in particular for partially or fully automated manual transmissions.

In another embodiment for a vehicle fitted with a continuously variable transmission, the transmission ratio of the continuously variable transmission can be increased continuously.

The desire for braking is preferably detected in one or more of the following ways: detection of the position of a brake pedal, by means of a pedal sensor, by means of at least one brake-pressure sensor, by detection and evaluation of the vehicle deceleration. In principle, the desire for braking can be detected in any way.

Other objects, advantages and novel features of the present invention will become apparent from the following detailed description of the invention when considered in conjunction with the accompanying drawings.

DETAILED DESCRIPTION OF THE DRAWINGS

An exemplary embodiment of the invention is explained below with reference to a vehicle with an electrohydraulic brake system and with a transmission having a number of gear steps. However, the invention is not restricted to vehicles with electrohydraulic brake systems and with transmissions having a number of gear steps. On the contrary, it can equally well be used on vehicles with other vehicle brake systems (e.g. electromechanical brake systems) and on vehicles with transmissions that are continuously variable, for example.

Figure 1:
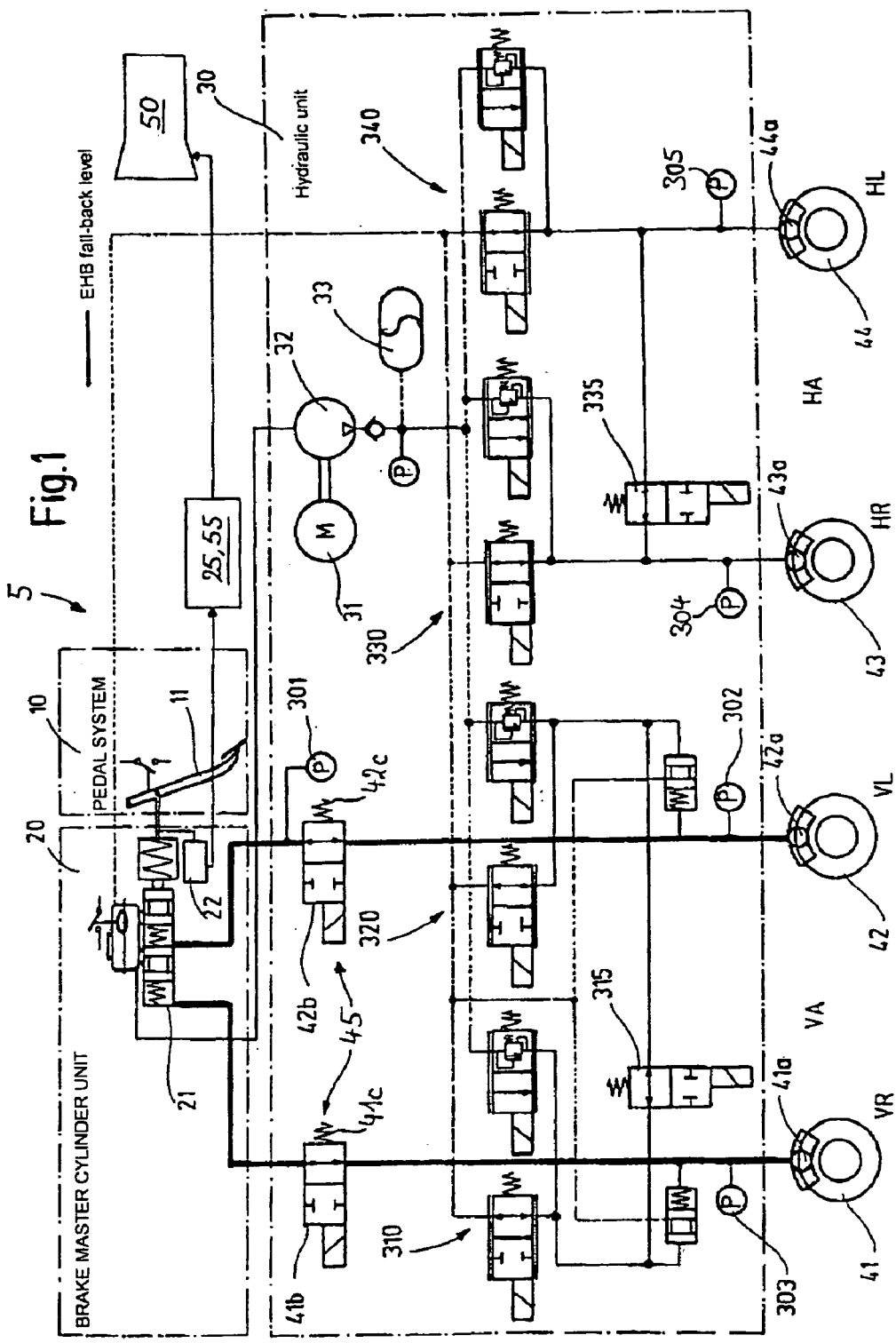
FIG. 1 is a schematic depiction of apparatus for carrying out the method according to the invention, with an electrohydraulic brake system and a transmission.

A vehicle brake system 5 illustrated in FIG. 1 comprises a brake master cylinder unit 20, which can be actuated by means of a pedal system 10 and, for its part, comprises a dual-circuit brake master cylinder 21. The position of a brake pedal 11 is detected by a pedal-travel sensor 22, the signal from which is transmitted to a brake control device 25. The brake control device 25 activates a hydraulic unit 30, which has an electric motor 31 and a pump 32, which can be driven by the electric motor 31 and by means of which hydraulic fluid can be put under pressure. An accumulator 33 is filled with the pressurized hydraulic fluid. The hydraulic unit 30 furthermore comprises valve units 310, 320, 330, 340, by means of which wheel brake devices 41a, 42a, 43a, 44a arranged at the wheels 41, 42, 43, 44 can be subjected to pressure or by means of which the pressure in the wheel brake devices 41a, 42a, 43a, 44a can be dissipated. For this purpose, the valve units 310, 320, 330, 340 each comprise an electrically activatable valve for dissipating the pressure in the wheel brake devices 41a, 42a, 43a, 44a and an electrically activatable proportional valve, by means of which the wheel brake devices 41a, 42a, 43a, 44a can be subjected to pressure in a controlled manner.

Arranged between respective pairs of valve units 310, 320 and 330, 340, each assigned to one axle, there are furthermore two 2-way valves 315, 335, by means of which a pressure balance can be established between the wheel brake cylinders 41a and 42a arranged at the front axle (VA) (i.e., at a right-hand front wheel (VR) 41 and at a left-hand front wheel (VL) 42), and the wheel brake devices 43a and 44a arranged at the rear axle (HA), (i.e., at a right-hand rear wheel (HR) 43 and at a left-hand rear wheel (HL) 44).

Pressure sensors 302, 303, 304, 305, which measure the current brake pressure in the respectively associated wheel brake device 41a, 42a, 43a, 44a and pass the measured value to the brake control device 25, for control of the brake pressure for example, are furthermore provided on the wheel brake devices 41a, 42a, 43a, 44a. An other pressure sensor 301 measures the pressure in the dual-circuit brake master cylinder 21, and this measured value too is transmitted to the brake control device.

In the invention, the pressure sensors 302, 303, 304, 305 also serve to monitor the hydraulics of the vehicle brake system 5 and are thus part of a monitoring device.

In the event of a malfunction, (e.g., if the hydraulic pressure-generating unit of the vehicle brake system 5 fails), a fall-back level is provided, which is illustrated schematically in FIG. 1 by bold lines. If a malfunction is detected in the vehicle brake system, the 2/2-way valves 41b, 42b, which represent an electrically actuable changeover device 45, are switched to the position shown in FIG. 1 by means of the brake control device 25, with the result that a hydraulic through-connection is formed from the dual-circuit brake master cylinder 21 to the wheel brake devices 41a and 42a arranged at the front axle (VA). This makes it possible to generate a brake pressure in the dual-circuit brake master cylinder 21 by depressing the pedal 11 and hence to bring about a braking force at the wheel brake devices 41a and 42a at the front axle. The wheel brake devices 43a and 44a arranged at the rear axle (HA) remain unpressurized in this example.

It goes without saying that, as a modification of this, it would also be possible in addition to provide a direct hydraulic connection from the dual-circuit brake master cylinder 21 to the wheel brake devices 43a, 44a on the rear axle in the event of a malfunction.

The changeover device 45 is furthermore also moved into the position illustrated in FIG. 1 by the restoring force of mechanical return means 41c, 42c if the electrical energy supply fails, with the result that even then there is a direct hydraulic connection between the dual-circuit brake master cylinder 21 and the wheel brake devices 41a, 42a, enabling the vehicle still to be braked.

A malfunction can be detected, for example, by means of the monitoring device, which comprises the pressure sensors 301, 302, 303, 304, 305 in this example. It is possible to assess the operating capability of the hydraulic vehicle brake system by means of the values measured by the pressure sensors. Of couse, the monitoring device can also have other sensors (not shown).

The invention is based on the idea of intensifying the braking effect at the driven wheels (in this case wheels 43, 44 on the rear axle) by increasing the braking torque acting at these wheels. The braking torque at the driven wheels 43, 44 is brought about by the current engine overrun torque, which is transmitted to the driven wheels via a transmission 50 (illustrated schematically in FIG. 1) and other components (not shown) of the vehicle's drive train in a known manner. It is assumed here that the driver does not simultaneously actuate the accelerator pedal when demanding a braking operation, something that would lead to a drive torque being transmitted to the driven wheels rather than to a braking torque. This eventuality can also be excluded in a simple manner in the case of an electrically actuated accelerator pedal (electronic engine output control), e.g., by deliberate suppression of the demand of the accelerator pedal.

The increase in the braking torque at the driven wheels 43, 44 is achieved by increasing the transmission ratio. This is accomplished by influencing the vehicle's transmission 50—e.g., an automatic power-shift transmission, a manual transmission, especially a fully or partially automated manual transmission, or a continuously variable automatic transmission—by shifting the transmission 50 to a lower drive step or lower gear or by increasing the transmission ratio in the case of a continuously variable automatic transmission 50, thereby generating a higher braking torque through better utilization of the engine overrun torque. In this context, a fully or partially automated manual transmission can be actuated by the transmission control unit 55 by means of actuators, for example.

To influence the transmission ratio by means of the transmission control unit 55, it is essential that the malfunction should not affect the electrical energy supply. If the electrical energy supply fails, the transmission control unit 55 is no longer functional, with the result that it is only possible to brake by means of the fall-back level of the vehicle brake system 5, as hitherto customary.

An exemplary embodiment of a method for braking a vehicle with a vehicle brake system in accordance with FIG. 1 is explained below.

Only the front axle can be braked by means of the hydraulic fall-back level, which is illustrated in bold in FIG. 1. In this case, the vehicle can be decelerated at a maximum of about 3 m/s$^2$.

The following assumptions are made:

The overall ratio of the driven axle and of the transmission in gear step 1 is $i_{ges}=10$.

The useful engine overrun torque $M_{Schlepp}$ is 50 Nm.

The dynamic wheel radius is $R_{dyn}=0.3$ m.

The vehicle's mass $m_{Fzg}$ is 1600 kg and there is

A sufficient coefficient of road adhesion.

The additional braking force obtained by way of the engine overrun torque is thus $$\Delta F = M_{schlepp} * i_{ges}/r_{dyn} = 50*10/0.3 \; N \approx 1600 \; N.$$

This results in an additional deceleration due to $\Delta F$:

$$\Delta a = \Delta F/m_{Fzg} = 1600/1600 * m/s^2 = 1 * m/s^2.$$

The maximum achievable vehicle deceleration can be increased by about 30% in this way.

Figure 2:
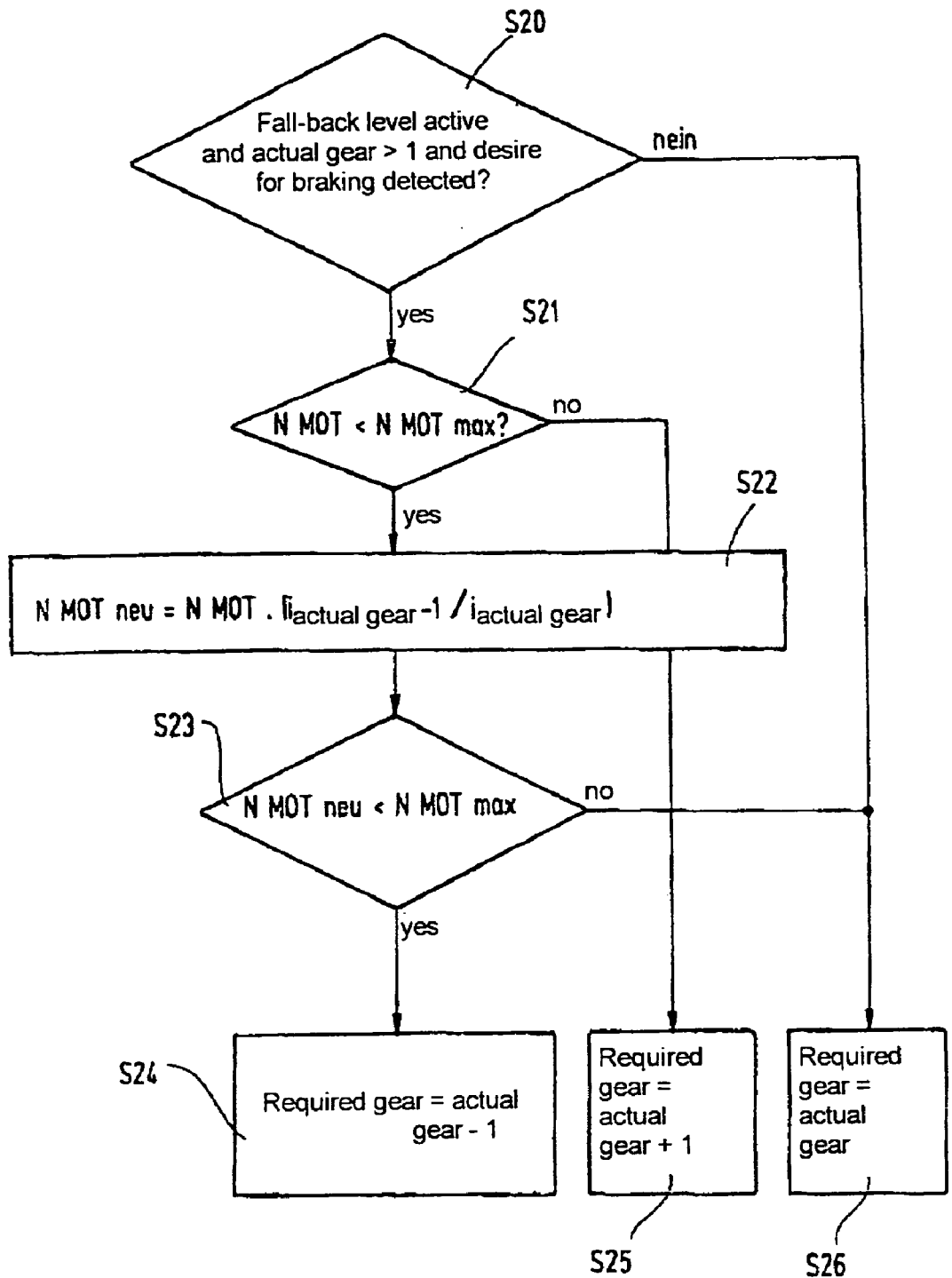
FIG. 2 is a flow chart which illustrates an exemplary embodiment of the method according to the invention.

The method steps for increasing the braking torque at the wheels 43, 44 on the rear axle are illustrated schematically in FIG. 2.

If a desire for braking on the part of the driver of the vehicle is detected, the system first of all checks, in a step S20, whether the fall-back level is active and whether the selected actual gear is higher than 1 (i.e., a gear higher than first gear is selected). The fall-back level is active when there is a malfunction in the vehicle brake system 5, as described above, and the changeover device 45 connects the dual-circuit brake master cylinder 21 to the wheel brake devices 41a, 42a. Activation of the fall-back level can therefore be detected from the position of the changeover device 45.

If the fall-back level is not active, or if first gear is selected (highest possible transmission ratio), when the driver wants to brake, the actual gear is retained as the required gear (step S26). The same also applies when no desire for braking on the part of the driver has been detected in step S20.

Otherwise, the system checks, in step S21, whether the detected actual engine speed NMOT is less than a stored maximum engine speed NMOTmax. If this is not the case, (i.e., the detected actual engine speed NMOT is greater than or equal to the maximum engine speed NMOTmax), a required gear corresponding to the actual gear increased by one step is established in step S25, i.e. the system changes up a gear, with the result that the engine speed falls owing to the lower transmission torque thereby achieved. The engine is thereby protected from overloading. If the detected actual engine speed NMOT is less than the maximum engine speed NMOTmax, on the other hand, a new engine speed NMOTneu is calculated in step S22, this corresponding to the engine speed which occurs when the manual transmission is shifted down by one gear step. In step S23, the system then checks whether this calculated new engine speed NMOTneu is less than the maximum possible engine speed NMOTmax. If this is not the case, the instantaneously selected actual gear is retained as the required gear (step S26). If this is the case, on the other hand, the actual gear is reduced by one gear step in step S24, i.e. the system changes down by one gear. This lowered gear step then corresponds to the required gear.

By means of the method described, the braking torque brought about at the driven wheels 43, 44 by the engine overrun torque can be increased in a simple manner by selecting a lower gear step (increasing the transmission ratio) in the case of a braking operation. When of course the vehicle has come to a halt or is moving at only a low speed below a predeterminable limiting speed, it is possible to shift to neutral or decouple the transmission in order to prevent the engine from stalling.

A vehicle braking operation can be detected in a simple manner by a change in the position of the brake pedal 11, by means of the pedal sensor 22, by means of brake-pressure sensors 301, 302, 303 or by detection and evaluation of the vehicle deceleration. In an emergency situation (e.g., if the hydraulic unit 30 fails), a braking effect at the rear wheels 43, 44 in addition to the front wheels 41, 42, which are braked by the fall-back level, is made possible by means of the controlled shifting down of the transmission 50 as described or the increase in the transmission ratio, as is an advantageous utilization of the engine overrun torque.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for braking a vehicle having a brake system with an electrically and/or electronically operable brake control device, wheel brake devices and a brake master cylinder which is hydraulically isolated from said wheel brake devices during normal operation of the brake system, as well as an engine whose torque is transmitted via a transmission to driven wheels of the vehicle, said method comprising:
   determining when there exist both a malfunction in the vehicle brake system and a demand for a braking operation; and
   responsive to said determining, establishing a hydraulic through-connection at least between the brake master cylinder and the wheel brake devices at at least one vehicle axle, and increasing a transmission ratio of said transmission automatically by a transmission control device, which activates the transmission, to produce an increased braking torque acting at the driven wheels;
   wherein the transmission ratio is increased only if current engine speed and a calculated engine speed resulting from an increase are both below a predeterminable limiting value.

2. The method according to claim 1, wherein the malfunction to be detected is a fault in a hydraulic segment of the vehicle brake system.

3. The method according to claim 2, wherein, for detection of a malfunction, at least hydraulic components required for the operation of the vehicle brake system are monitored.

4. The method according to claim 1, wherein the transmission ratio of an automatic power-shift transmission is increased by shifting down to a lower drive step.

5. The method according to claim 1, wherein the transmission ratio of a manual transmission is increased by shifting down to a lower gear by means of actuators.

6. The method according to claim 1, wherein the transmission ratio of a continuously variable automatic transmission is increased continuously.

7. The method according to claim 1, wherein a desire for braking is detected by at least one of detecting a position of a brake pedal, use of a pedal sensor, use of at least one brake-pressure sensor, and detecting and evaluating vehicle deceleration.

8. The method according to claim 1, wherein:
   the transmission ratio is increased only if current engine speed is below a predeterminable limiting value; and
   the transmission ratio is reduced if current engine speed has reached said predeterminable limiting value.

9. A system for braking a vehicle, comprising:
   an electrically operable brake control device;
   wheel brake devices;
   a brake master cylinder which is hydraulically isolated from said wheel brake devices during normal operation of said system;
   an engine whose engine torque is transmitted via a transmission to driven wheels of the vehicle;
   means for determining when there exist both a malfunction in the vehicle brake system and a demand for a braking operation;
   a changeover device responsive to said determining, for establishing a hydraulic through connection at least between the brake master cylinder and the wheel brake devices at at least one vehicle axle; and
   means responsive to a positive result in said determining for increasing a transmission ratio of said transmission automatically, including a transmission control device which activates the transmission, to produce an increased braking torque acting at the driven vehicle wheels;
   wherein the transmission ratio is increased only if current engine speed and a calculated engine speed resulting from an increase are both below a predeterminable limiting value.

10. The apparatus according to claim 9, wherein the vehicle brake system is an electrohydraulic brake system.

11. The apparatus according to claim 9, wherein the brake control device and the transmission control unit are integrated in a common control unit.

12. The apparatus according to claim 9, further comprising a monitoring device, which transmits monitoring signals to the brake control device, for monitoring the operation of the vehicle brake system.

13. The apparatus according to claim 12, wherein the monitoring device has at least one pressure sensor for measuring hydraulic pressure.

14. A method for controlling braking of a vehicle having at least a pair of front wheels and a pair of rear wheels, and a transmission for applying driving and braking torque at a first pair selected from said front and rear pairs of wheels, comprising:

detecting an occurrence of a malfunction in a brake system of said vehicle and demand for braking concurrent therewith;

responsive to a detection of said occurrence, activating a fall-back braking operation in which a through connection is established between a brake master cylinder of said vehicle and hydraulically actuated braking devices for wheels at the other pair of front and rear pairs of wheels;

determining in a first determining step whether there exist concurrently, i) an activation of said fall back braking operation, ii) an actual current gear other than that having a highest gear ratio, and iii) a demand for braking;

in response to a positive result of said first determining step, determining second whether current engine speed of said vehicle is less than a predetermined maximum value;

in response to a positive result of said second determining step, calculating a new engine speed that corresponds to a predetermined increase of the gear ratio of said transmission;

determining third whether the calculated new engine speed is less than said predetermined maximum value;

in response to a positive result in said third determining step, increasing the gear ratio by said predetermined increase.

15. The method according to claim 14, further comprising:

in response to a negative result in either of said first and third determining steps, maintaining a current gear setting of said transmission.

16. The method of claim 14, further comprising:

in response to a negative result in said second determining step, reducing said gear ratio by a predetermined amount.

* * * * *